Feb. 12, 1935.  S. F. WILLIAMS  1,990,721
ROD COUPLING
Filed May 29, 1933
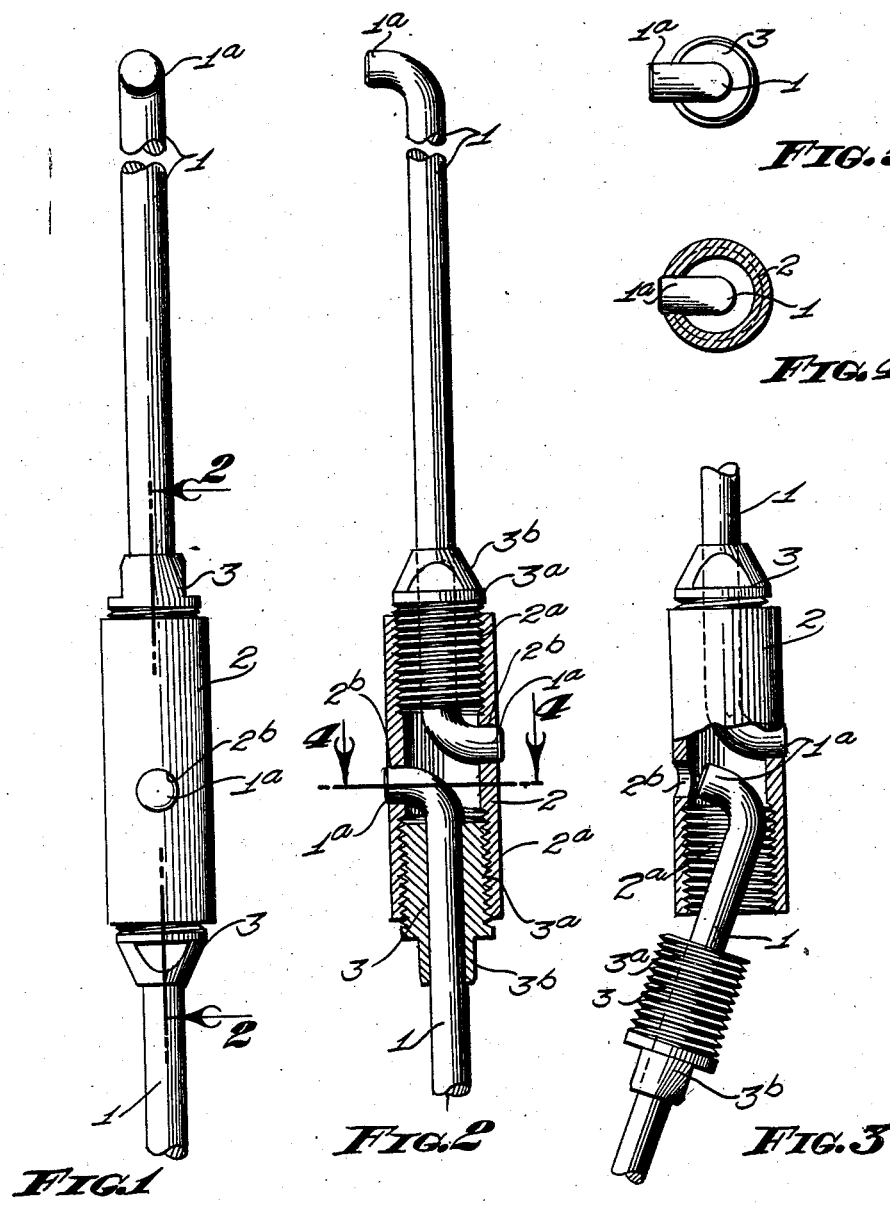
INVENTOR
SAMUEL F. WILLIAMS
BY A. B. Bowman
ATTORNEY Patented Feb. 12, 1935

1,990,721

UNITED STATES PATENT OFFICE 1,990,721

ROD COUPLING

Samuel F. Williams, San Diego, Calif.

Application May 29, 1933, Serial No. 673,326

10 Claims. (Cl. 287—103)

My invention relates to rod couplings, and the objects of my invention are:

First, to provide a coupling which is adapted to hold a pair of rods in axial alinement;

Second, to provide a coupling of this class which may be made particularly compact yet is capable of withstanding any of the tension or compression strains within the strength of the rods connected thereby;

Third, to provide a coupling of this class in which the parts are few in number and particularly simple of construction, thereby providing a coupling which is economical of manufacture; and Fourth, to provide on the whole a novelly constructed rod coupling which is durable, efficient in its action, and which will not readily deteriorate or get out of order.

With these and other objects in view as will appear hereinafter, my invention consists of certain novel features of construction, combination, and arrangement of parts and portions as will be hereinafter described in detail and particularly set forth in the appended claims, reference being had to the accompanying drawing and to the characters of reference thereon which form a part of this application, in which:

Figure 1 is an elevational view of my rod coupling; Fig. 2 is a longitudinal sectional view thereof through 2—2 of Fig. 1 with parts and portions shown in elevation; Fig. 3 is a similar sectional view showing the manner in which the rods are joined to the coupling; Fig. 4 is a transverse sectional view through 4—4 of Fig. 2; and Fig. 5 is an end elevational view of a rod and coupling screw.

Similar characters of reference refer to similar parts and portions throughout the several views of the drawing.

Rods 1, sleeve 2, and collars 3 constitute the principal parts and portions of my rod coupling.

The rods designated 1 are preferably round but may have any suitable section and any desired length. The ends of each rod 1 are provided with laterally bent projections 1a, having short axially extending extremities disposed at right angles to the axis of the rod 1.

Either end of a rod is adapted to fit within a sleeve 2 which is cylindrical in form and provided with internally threaded portions 2a at each end. Near its central portion and at opposite sides the sleeve 2 is provided with two apertures 2b of sufficient size to receive the ends of the rods 1.

At each end, each rod has slideably mounted thereon a collar 3. The collar 3 comprises an externally threaded portion 3a adapted to coact with the internal thread 2a of the sleeve 2, and a frusto-conical head portion 3b having notches therein adapted to be engaged by a suitable tool.

The head portions are smaller in diameter than the sleeve and tapered so that when the coupling is inserted in a pipe as when used in conjunction with sewer cleaning rods, they cannot engage the walls of the pipe. Thus the rods may be turned in either direction without danger of the collars working loose.

The bore through each collar 3 is adapted to center the rod relative to the sleeve 2, thus when two rods are positioned in the sleeve 2 and the collars 3 are secured, the rods are in axial alinement as shown in Fig. 2. The lateral extent of the end portions 1a may be slightly greater than the internal diameter of the sleeve 2, the rod being inserted first at an angle, as shown in Fig. 3.

Though I have shown and described a particular construction, combination, and arrangement of parts and portions, I do not wish to be limited to this particular construction, combination, and arrangement, but desire to include in the scope of my invention the construction, combination, and arrangement substantially as set forth in the appended claims.

Having thus described my invention, what I claim as new and desire to secure by Letters Patent is:

1. A rod coupling comprising, a sleeve having a lateral aperture therein, a rod having a laterally extending end portion adapted to be inserted in said sleeve and be surrounded by the wall of said aperture, and retainer means at said sleeve embracing said rod and secured to said sleeve for centralizing said rod in said sleeve and holding said end portion in said aperture.

2. A rod coupling comprising, a sleeve having a lateral aperture therein, a rod having a laterally extending end portion adapted to be inserted in said sleeve and be surrounded by the wall of said aperture, and a collar on said rod threaded into said sleeve for centralizing said rod in said sleeve and retaining said end portion in said aperture.

3. A rod coupling comprising, a sleeve having a lateral aperture therein, a rod including a lateral end portion and adapted to be inserted in said sleeve, said end portion adapted to fit in said aperture when said rod is concentrically disposed in said sleeve, and substantially fill said aperture and screw threaded means for securing said rod in centered relation with said sleeve.

4. A rod coupling comprising, a sleeve having a lateral aperture through the wall of said sleeve, a rod including a lateral end portion and adapted to be inserted in said sleeve, said end portion adapted to fit in said aperture and substantially fill the same when said rod is concentrically disposed in said sleeve, and a collar slidably mounted on said rod and screwably connected in said sleeve for holding said rod in centered relation therewith.

5. A rod coupling comprising, a sleeve having lateral apertures therein at its central portion at opposite sides and internally threaded end portions, centering collars for each threaded end portion, and rods extending through said collars and having laterally directed end portions adapted to fit said apertures, said collars adapted to retain said rods in axial alinement and the end portions thereof in said apertures.

6. A rod coupling comprising, a sleeve having opposed lateral apertures therein at its central portion and opposed internally threaded end portions, externally threaded centering collars for each threaded end portion, and rods extending through said collars and having laterally turned end portions adapted to fit said apertures, said collars adapted to retain said rods in axial alinement and the end portions thereof secured in said apertures, each of said collars being less in diameter than said sleeve and tapering outwardly therefrom and provided with flattened wrench receiving portions.

7. In a rod coupling for connecting a plurality of long rods end to end, a sleeve having a lateral aperture therein, a rod having a laterally extending end portion adapted to be inserted in said sleeve and extend into and be surrounded by the wall of said aperture, and retainer means in said sleeve embracing the one end of said rod and secured to said sleeve for centralizing said rod in said sleeve and holding said end portion in said aperture.

8. In a rod coupling for connecting a plurality of long rods end to end, a sleeve having a lateral aperture therein, a rod including a lateral end portion adapted to be inserted in said sleeve, said end portion arranged and formed to fit in said lateral aperture when said rod is concentrically disposed in said sleeve and substantially fill said aperture, and screw threaded means for securing said rod in centered relation with said sleeve with its end filling said aperture.

9. In a rod coupling for connecting a plurality of long rods end to end, a sleeve having lateral apertures therein at its central portion at opposite sides and in offset relation to each other, said sleeve having internally threaded end portions at its opposite ends, centering collars for each threaded end portion, and rods extending through said collars and having laterally directed end portions adapted to fit into said apertures at their extended ends and fill said apertures, said collars adapted to receive said rods in axial alinement centrally in said sleeve.

10. In a rod coupling for connecting a plurality of long rods end to end, a sleeve having opposed lateral apertures therein at its central portion in offset relation to each other longitudinally of said sleeve, said sleeve also having opposed internally threaded end portions, externally threaded centering collars for each threaded end portion, and rods extending through said collars and having laterally turned end portions turned in opposite directions at the opposite ends, one of said ends adapted to fit said apertures, said collars adapted to retain said rods in axial alinement and the end portions thereof secured in said apertures and filling the same, each of said collars being less in diameter than said sleeve and tapering outwardly therefrom and provided with flattened wrench receiving portions thereon.

SAMUEL F. WILLIAMS.